United States Patent

Macit

Patent Number: 6,122,913
Date of Patent: Sep. 26, 2000

[54] DRIVE FOR A MOBILE OPERATING DEVICE

[75] Inventor: Recep Macit, Düsseldorf, Germany

[73] Assignee: Mannesmann Aktiengesellschaft, Düsseldorf, Germany

[21] Appl. No.: 09/059,873

[22] Filed: Apr. 14, 1998

[51] Int. Cl.[7] ................................................. F16D 31/02
[52] U.S. Cl. ........................ 60/419; 60/484; 60/486; 60/427
[58] Field of Search ................................ 60/484, 486, 427, 60/419

[56] References Cited

U.S. PATENT DOCUMENTS 5,117,936  6/1992  Nakamura et al. .

FOREIGN PATENT DOCUMENTS 084 800   8/1983   European Pat. Off. .
759 371   2/1997   European Pat. Off. .
25 02 488 7/1975   Germany .
35 16 429 11/1976  Germany .

OTHER PUBLICATIONS

Product brochure entitled "Pumpenverteilergetriebe MOBILEX IVP" of Lohmann +Stolterfoht, pp. 1–4 Mar. 1991.

*Primary Examiner*—Edward K. Look
*Assistant Examiner*—Hermes Rodriquez
*Attorney, Agent, or Firm*—Cohen, Pontani, Lieberman & Pavane

[57] ABSTRACT

A drive system for a mobile operating device. The drive system includes a drive motor driving a first variable-delivery hydraulic pump which is in fluid engagement with a first hydraulic motor, the first hydraulic motor being part of a hydraulic travelling drive. A second hydraulic motor drives at least one second variable-delivery hydraulic pump which is in fluid engagement with an operating hydraulic system for implementing device-specific functions.

8 Claims, 1 Drawing Sheet

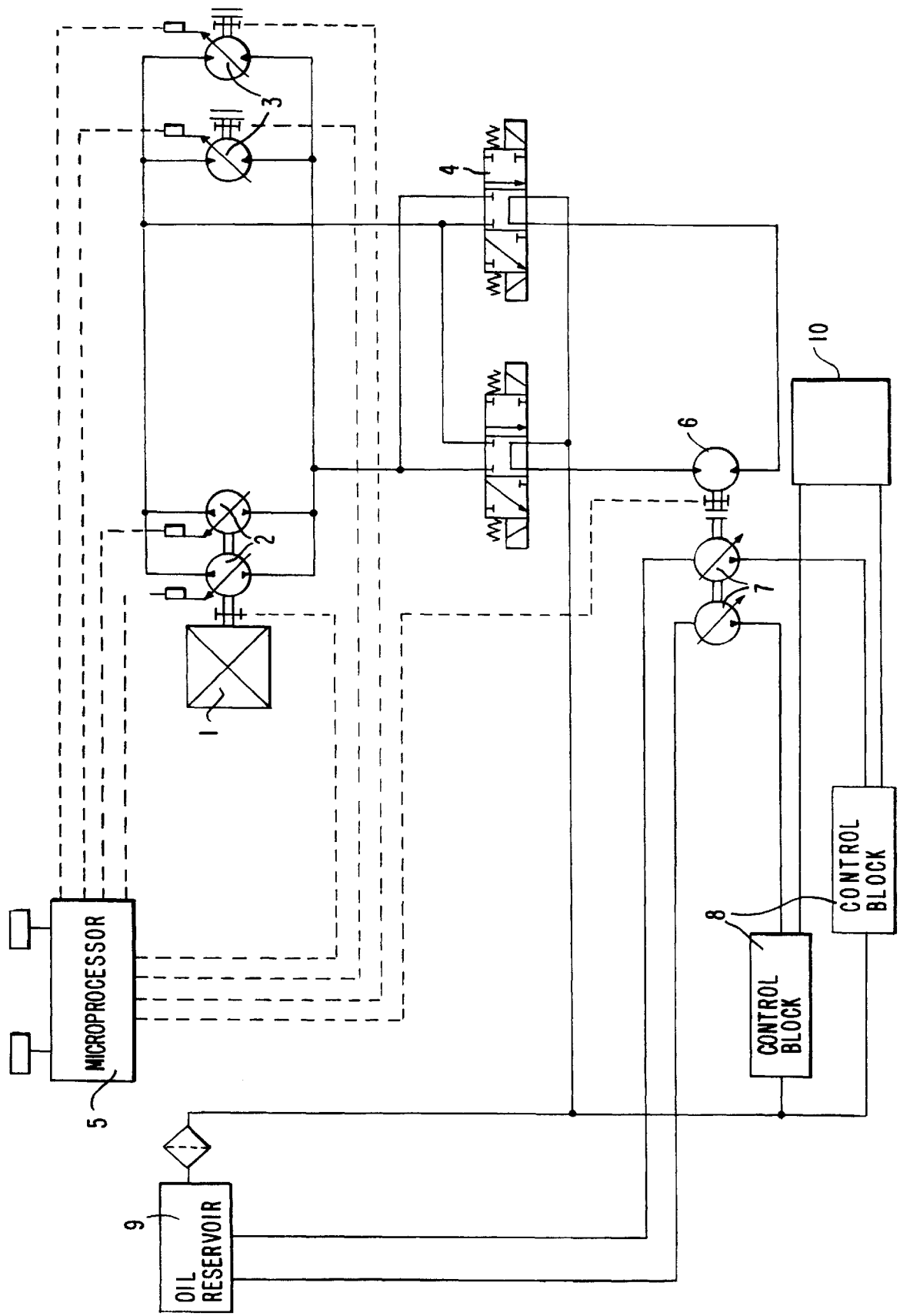

DRIVE FOR A MOBILE OPERATING DEVICE

BACKGROUND OF THE INVENTION

1. Field of the Invention

The present invention relates to a drive system for a mobile operating device typically having track, tire or chain travelling mechanisms wherein an operating hydraulic system is combined with the travelling hydraulic system of the device.

The drive system includes a drive motor driving a first hydraulic variable-delivery pump in fluid connection with a hydraulic travelling drive having a first hydraulic motor; and further includes a second hydraulic variable-delivery pump in fluid connection with the operating hydraulic system so as to implement device-specific functions.

2. Description of the Related Art

Known drive systems of mobile operating devices of this type use separate variable-delivery pumps for each travelling drive, hydraulic lifting mechanism and luffing or slewing mechanism so as to supply each respective operating system with a pressure medium. A drive motor, typically a diesel engine, transmits power to the variable-delivery pumps by means of pump distributor gears which are directly flanged to the variable-delivery pumps. Not only are the pump distributor gears expensive, they are also markedly reduced the efficiency of the drive train.

SUMMARY OF THE INVENTION

The object of the present invention is to provide a drive system for mobile operating devices with improved efficiency and reduced production costs over known drive systems. To attain this object, a first variable-delivery hydraulic pump is simultaneously connected to a hydraulic travelling drive having a first hydraulic motor, and, in a selectively connectable fashion, to a second hydraulic motor driving a second variable-delivery hydraulic pump of the operating hydraulic system.

The present invention advantageously eliminates the pump distributor gear and its drive-specific losses in efficiency q, such as associated frictional and thermal losses.

In an advantageous embodiment of the present invention, a first closed circuit including the first variable-delivery hydraulic pump in fluid engagement with the first hydraulic motor, branches off in a selectively connectable fashion to a second closed circuit supplying the second hydraulic motor. The second variable-delivery hydraulic pump no longer needs to be flanged to pump distributor gears in the vicinity of the drive motor thereby considerably reducing the installation space needed by the operating hydraulic system.

In another advantageous embodiment of the present invention, the rotational direction of the first hydraulic motor is reversible and the rotational speed of the second hydraulic pump is constant. The first variable-delivery hydraulic pump fluid urges the second hydraulic motor, so that the rotational direction of the first variable-delivery hydraulic pump thereby determines the rotational direction of second hydraulic motor. Four-way valves selectively connect the second closed circuit to the first closed circuit. The four-way valves are controlled by a microprocessor based on parameters defining the rotational direction of the first variable-delivery hydraulic pump.

According to a further embodiment of the present invention, the drive shaft of the first variable-delivery pump drive is directly connected to the output shaft of the drive motor, resulting in an especially space-saving and compact installation.

The present invention has other advantages as well, such as the elimination of the rather expensive pump distributor gear. This improves the efficiency $\eta$ of the drive by approximately 10% to 15% compared with that of a conventional travelling drive. Elimination of the pump distributor gear also allows an otherwise required cooling circuit to be omitted, further contributing to the improvement of the efficiency $\eta$. Moreover, a mooring circuit in connection with the travelling drive is no longer necessary thereby considerably reducing the installation space of the operating hydraulic system.

As a further advantage of the present invention, when the device is braked the second variable-delivery hydraulic pump acts as a retarder pump, so that during the braking process the diesel engine operates at idle speed. In addition, a portion of the braking energy is used to drive the diesel engine fan during braking, further improving the efficiency $\eta$.

The present invention reduces production costs by approximately 20% while improving efficiency $\eta$ by 10% to 15% compared with that of a conventional travelling drive, thus creating better sales opportunities in the marketplace.

The various features of novelty which characterize the present invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawing shows, in simplified fashion, the schematic diagram of a hydraulic travelling drive with a connectable operating hydraulic system pursuant to the present invention.

DETAILED DESCRIPTION OF THE PREFERRED EMBODIMENTS

As is shown in the drawing, the present drive system for a mobile operating device includes a drive motor 1 having an output shaft, the drive motor 1 being rotationally reversible. The drive motor 1 is arranged to drive a first variable-delivery hydraulic pump 2 having a drive shaft. A hydraulic travelling drive includes a first hydraulic motor 3 that is in fluid engagement with the first variable-delivery hydraulic pump 2. A first closed circuit includes the first hydraulic motor 3, so that the first variable-delivery hydraulic pump 2 urges the first hydraulic motor 3.

In a preferred embodiment of the drive system of the present invention, the output shaft of the first variable-delivery hydraulic pump 2 is flanged directly to the drive shaft of the drive motor 1. In another preferred embodiment the drive motor 1 is a diesel engine.

A second closed circuit includes a second hydraulic motor 6 arranged therein, the second hydraulic motor 6 actuating a hydraulic device 10 in an operating system. Four-way valves 4 selectively connect the first closed circuit to the second closed circuit.

In a first mode of operation, to particularly move the mobile operating device, the four-way valves 4 are set to a first position (as illustrated) thereby permitting fluid flow through the first closed circuit while prohibiting fluid flow to the second closed circuit. Operation of the drive motor 1 drives the first variable-delivery hydraulic pump 2 thereby transmitting hydraulic fluid through the first closed circuit so as to urge the first hydraulic motor 3.

In a second mode of operation, to move the mobile operating device and simultaneously actuate the operating hydraulic system, the four-way valves 4 are set to either a second or third position, thereby permitting fluid flow simultaneously through the first closed circuit and the second closed circuit. The four-way valves 4 are positioned by means of a microprocessor 5 in dependence upon parameters relating to the rotational direction of the first variable-delivery pump 2. In either the second or the third position, functioning of the first closed circuit and the hydraulic travelling drive are identical to the first mode as described above. Additionally, the first variable-delivery hydraulic pump 2 pumps hydraulic fluid to the second closed circuit to urge the second hydraulic motor 6. The second hydraulic motor 6 drives the second variable-delivery pump 7 which in turn operates the operating hydraulic system. Operation of the operating hydraulic system, so as to supply various consumers of the operating hydraulic system including the hydraulic device 10, is determined by control blocks 8. Hydraulic fluid is supplied from an oil reservoir 9 arranged therein. In a preferred embodiment of the invention, the second hydraulic motor 6 is a constant speed motor.

In a third mode of operation, to stop the operating device and to simultaneously operate the operating hydraulic system, the first variable-delivery hydraulic pump 2, the first hydraulic motor 3 and the second hydraulic motor 6 operate in fluid communication in a closed circuit arrangement. The first hydraulic motor 3 is set to zero flow and the second hydraulic motor 6 is constant speed. The four-way valves 4 are set to either of the second or third positions by means of the microprocessor 5 in dependence upon parameters relating to the rotational direction of the first various-delivery hydraulic pump 2.

In a fourth mode, to operate as a braking function, the first variable-delivery hydraulic pump 2 is set to zero flow. The first hydraulic motor 3 and the second hydraulic motor 6 for the operating hydraulic system are in fluid communication in a closed circuit arrangement. The drive motor 1 speed n is returned to idle speed, and the four-way valves 4 are set to either the second or third position by means of the microprocessor 5 in dependence upon parameters relating to the rotational direction of the first hydraulic motor 3. Braking is accomplished by the resistive pressure of the operating hydraulic system against the second hydraulic motor 6 and the second variable-delivery hydraulic pump 7.

The invention is not limited by the embodiments described above which are presented as examples only but can be modified in various ways within the scope of protection defined by the appended patent claims.

I claim:

1. A drive system for a mobile operating device and a hydraulic device, comprising:

a hydraulic travelling drive having a first hydraulic motor;

a first variable-delivery hydraulic pump operatively connected to the hydraulic travelling drive and having a rotatable drive shaft;

a drive motor having an output shaft connected to the first variable-delivery hydraulic pump drive shaft;

an operating hydraulic system operative to implement device-specific functions of the hydraulic device, the operating hydraulic system including a second variable-delivery hydraulic pump; and a second hydraulic motor rotatably connected to the second variable delivery hydraulic pump, the first variable-delivery hydraulic pump being in fluid engagement with the first hydraulic motor of the hydraulic travelling drive, and the first variable-delivery hydraulic pump being in a selectable fluid engagement with the second hydraulic motor for driving the second variable-delivery pump for the operating hydraulic system.

2. The drive system in accordance with claim 1, wherein the drive motor is a diesel engine.

3. The drive system in accordance with claim 1, wherein the first variable-delivery hydraulic pump and the first hydraulic motor are connected together in a first closed circuit.

4. The drive system in accordance with claim 3, wherein the second hydraulic motor is selectively connectable to the first closed circuit to form a second closed circuit.

5. The drive system in accordance with claim 1, wherein the second hydraulic motor is a constant speed motor.

6. The drive system in accordance with claim 4, and further comprising means for selectively connecting the second closed circuit to the first closed circuit.

7. The drive system in accordance with claim 6, wherein the connecting means includes four-way valves that are switchable in a microprocessor-controlled fashion in dependence on parameters relating to the rotational direction of the first variable delivery hydraulic pump.

8. The drive system in accordance of claim 1, wherein the output shaft of the drive motor is directly connected to the drive shaft of the first variable delivery hydraulic pump.

\* \* \* \* \*